April 1, 1941.  R. T. CORNELIUS  2,236,619
CONTROL DEVICE FOR BEER DISPENSING SYSTEMS
Filed Jan. 16, 1939
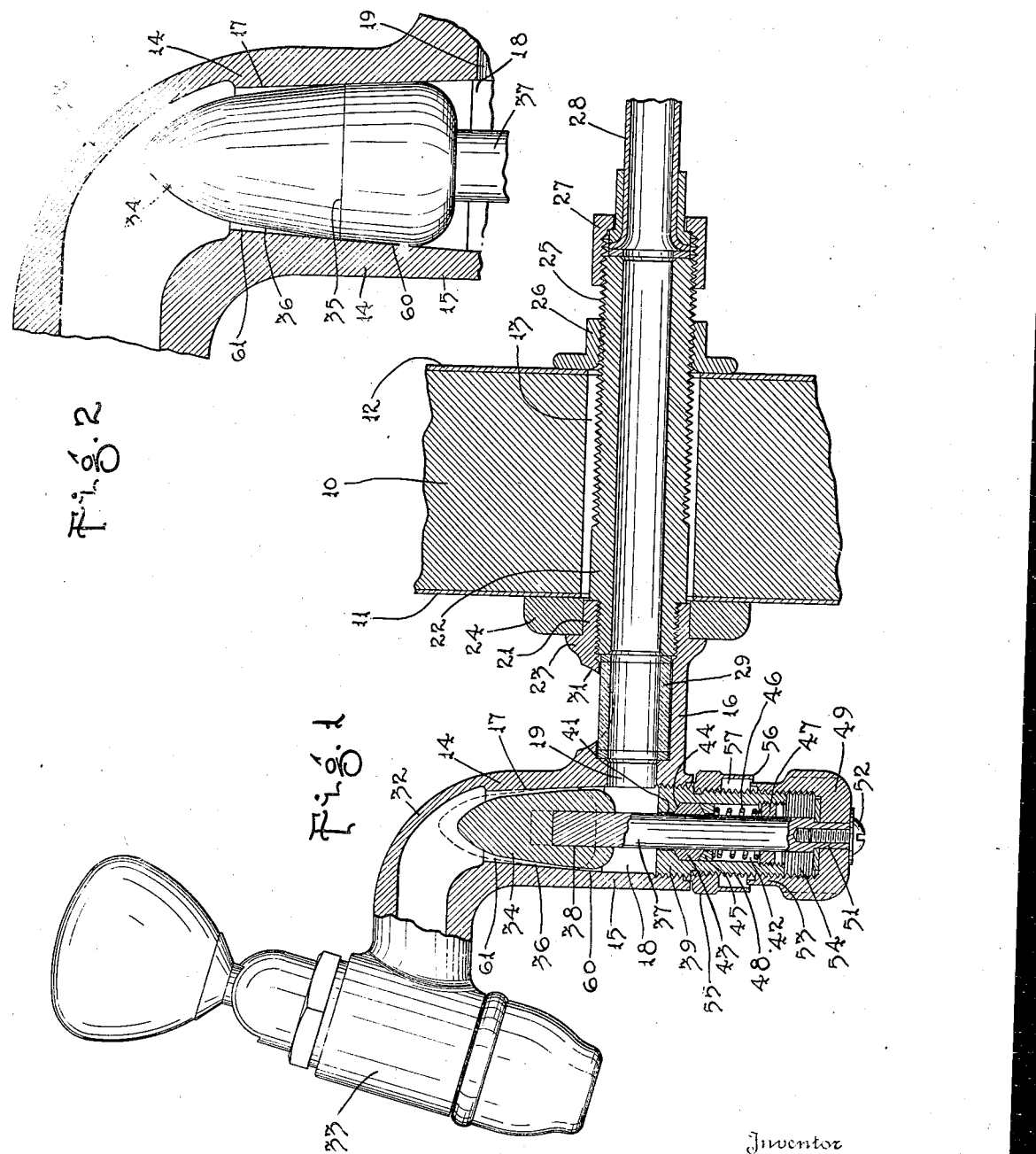
Inventor
Richard T. Cornelius
Caswell & Lagaard
Attorneys Patented Apr. 1, 1941

2,236,619

UNITED STATES PATENT OFFICE 2,236,619

CONTROL DEVICE FOR BEER DISPENSING SYSTEMS

Richard T. Cornelius, Minneapolis, Minn.

Application January 16, 1939, Serial No. 251,137

2 Claims. (Cl. 138—46)

My invention relates to control devices for beer dispensing systems and has for an object to provide an extremely simple and efficient device for preventing excess foaming of beer as the same is dispensed.

Another object of the invention resides in providing an extremely compact construction for the desired purpose.

A feature of the invention resides in providing a control device which may be directly connected to a faucet and disposed upon the exterior of the cabinet or object to which the faucet is attached.

An object of the invention resides in constructing the control device with a body having a conical bore therein and in providing a core within said bore forming in conjunction therewith a constricted passageway for creating resistance to the flow of the beer therethrough.

Another object of the invention resides in constructing said bore and core so that the cross sectional area of the constricted passageway, at the discharge end thereof, is greater than at the inlet end thereof so as to reduce the velocity of flow of the beer leaving the restricted passageway.

Another object of the invention resides in providing the core with a stem and in constructing the body to form a bearing to rotatably support the stem.

A feature of the invention resides in securing a knob to the end of the stem and in providing threads between the knob and a part carried by the body.

Another object of the invention resides in providing a member having a sleeve cooperating with said knob for concaling the threads.

An object of the invention resides in the specific construction for supporting the core and for moving the same within the bore.

Other objects of the invention reside in the novel combination and arrangement of parts and in the details of construction hereinafter illustrated and/or described.

In the drawing:

Fig. 1 is an elevational sectional view through a control device illustrating an embodiment of my invention.

Fig. 2 is an enlarged elevational sectional view of a portion of the structure shown in Fig. 1 illustrating the parts in altered position.

In the use of a constricted passageway for providing resistance in a beer supply conduit to reduce foaming, it becomes necessary to utilize a relatively long passageway in order not to make the cross sectional area of the passageway too small. If the cross sectional area becomes too small, the velocity of the beer discharged therefrom becomes great enough so that excess foaming occurs when the beer is drawn from the faucet thus defeating the purpose of the restricted passageway. The present invention overcomes this disadvantage by utilizing a structure providing a passageway of extremely small cross sectional area at the inlet end thereof and of a greater cross sectional area at the discharge end thereof to reduce the rate of flow of the beer prior to being discharged from the device.

For the purpose of illustrating the application of my invention I have shown in Fig. 1 a wall 10 covered with sheet metal linings 11 and 12 upon the exterior and interior thereof. The wall 10 may be the wall of a cabinet in which suitable cooling coils are placed for the purpose of cooling the beer prior to dispensation thereof, or the said wall may be any wall or object to which the control device and dispensating faucet are attached, as for example, a part of the bar or other fixture in the place in which the invention is to be used. The wall 10 has an opening 13 in the same through which a portion of the control device extends.

The control device consists of a hollow body 14 which has a vertically extending tubular portion 15 and a horizontally extending tubular portion 16. The tubular portion 15 is provided near the upper end of the same with a conical bore 17 tapering upwardly. Connected with this bore is a cylindrical bore 18 of the same diameter as the maximum diameter of the bore 17. The horizontal tubular portion 16 has a passageway 19 therethrough which communicates with the bore 18.

The horizontal tubular portion 16 of body 14 is formed with a boss 21 which is internally threaded to receive a nipple 22. This nipple extends through the hole 13 in the wall 10. Formed on the boss 21 is a flange 23 and encircling said flange is a collar 24 which bears against the same and agaist the outer surface of the lining 11 of wall 10. The nipple 22 is threaded at its other end, as designated at 25. Screwed upon the threads 25 is a nut 26 which holds the nipple 22 attached to the wall 10. A tube connection 27 attached to the end of the nipple 22, secures a tube 28 to the end of the said nipple. Tube 28 is connected to a suitable beer supply and may be the end of the cooling tube within the cooling cabinet of the beer dispensing system.

In the tubular portion 16 of body 14 is arranged a sight glass 29 which is exposed through an opening 31 in said tubular portion whereby the condition of the beer flowing through the passageway 19 may be observed.

Formed on the uppermost end of the tubular portion 15 of body 14 is an elbow 32. This elbow has connected to it a beer faucet 33. The particular construction of faucet 33, forming no feature of the invention, has not been shown in the drawing. It can, however, be readily comprehended that any type of faucet, such as is now in common use, may be employed.

Within the bore 17 of body 14 is arranged a core 34. This core is conical in shape and is constructed as best illustrated in Fig. 2. The core 34, at its larger end, is of the same angularity as the bore 17. This degree of angularity extends up to a locality designated by the reference numeral 35. From this locality the taper or angularity of said core is greater so that the smaller end of the core converges more rapidly than the larger end. When the core is disposed, as shown in Fig. 1, a constricted annular passageway 36 is formed between the core and bore which passageway is of greater cross sectional area at the end 61 thereof which is disposed at the smaller end of the core than at the other end 60 thereof which is disposed at the larger end of said core. The inlet end 60 of said constricted passageway affords sufficient resistance to prevent foaming of the beer when drawn from the faucet 33, while the discharge end 61 of the said passageway reduces the velocity sufficiently so that the condition of the beer passing upon leaving the passageway 36 is such as to not produce excessive foaming when drawn from faucet 33.

The core 34 is supported as follows: Issuing outwardly from the lower end of this core is a stem 37, which is pressed into a socket 38, formed in said core. The stem 37 is mounted for axial movement relative to the bore 36 and the core 34 in a bushing 39. The lower end of the tubular portion 15 of body 14 is internally threaded to receive the upper end of said bushing which is correspondingly externally threaded. The bushing 39 has a guideway 41 formed in it which is enlarged at the lowermost end of said bushing to provide a chamber 42. Within this chamber is disposed a packing 43 which is seated against a conical seat 44 in the bushing. A ring 45 disposed within the chamber 42 and encircling the stem 37 urges the packing 43 against the seat 44 and thus compresses the packing about the stem 37 and forms a fluid tight joint. The ring 45 is urged into engagement with the packing 43 by means of a compression coil spring 46 which is seated at one end against the said ring and at its other end against a collar 47, encircling the stem 37 and screwed into the lower end of the bushing 39.

The lowermost end of the bushing 39 is externally threaded, as indicated at 48. The stem 37 projects below the lowermost end of the bushing 39 and has secured to it at such end a knob 49. The extreme end of said stem is reduced in diameter, as designated at 51, and extends through said knob. A screw 52 is threaded to said reduced end of the stem and engages the knob and holds the same attached to the stem. The knob 49 is formed with a tubular portion 53 which is internally threaded at 54 to screw upon the threads 48 of bushing 39. By means of this construction the knob may be advanced axially along the said bushing whereby the stem 37 and core 34 may be moved longitudinally within the bore 17. For the purpose of concealing the threads 48 a collar 55 in the nature of a nut is employed, which collar is screwed upon the threads 48 of bushing 39. This collar has a sleeve 56 formed thereon which is spaced from the bushing 39 to provide an annular space 57 in which the tubular portion 53 of knob 49 may be received. The depth of the space 57 is sufficient to permit of reciprocating the core 34 the desired amount so as to move the said core to provide any degree of resistance to the beer which may be desired.

The operation of the invention is as follows: When the faucet 33 is opened, the pressure in the tube 28 causes the beer to flow through the passageway 19 and into the bore 18 of the tubular portion 15 of body 14. The beer flows from this bore through the annular passageway 36. At the restricted portion 60 thereof the pressure of the beer is reduced. In order to provide sufficient resistance to reduce the pressure in a relatively short distance, the cross sectional area of the portion 60 of passageway 36 is made extremely small. This greatly increases the velocity of the beer. When the beer reaches the tapering portion 61, of the passageway 36, the velocity is gradually reduced so that, when the beer flows into the elbow 32, it travels at a velocity such that excess foaming does not occur when the beer leaves faucet 33. In this manner beer with the proper amount of foam can be readily dispensed. If it becomes desirable to change the amount of foaming this can be accomplished by turning the knob 49. Rotation of the knob advances the core 36 in the conical bore 17, the core being shown in two extreme positions in Figs. 1 and 2.

The advantages of my invention are manifest. The control device can be constructed extremely short and compact so that the same can be placed upon the exterior of the cabinet with which the faucet is used without detracting from the appearance of the device. By arranging the control device upon the exterior of the cabinet the operating knob for moving the core can be placed directly upon the stem connected thereto so that intermediate motion transmission means will be unnecessary. By the use of the nut and sleeve co-operating with the knob the threads used for advancing and withdrawing the core are at all times sealed thereby protecting the same from injury and from water and beer so as to maintain the same at all times in proper condition for use. By means of the particular type of packing shown, leakage past the stem of the core is at all times prevented without effort on the part of the operator. My invention will operate continuously without servicing for an exceedingly long period of time. With my invention any degree of foaming can be procured. The device is neat and attractive in appearance and highly serviceable.

Changes in the specific form of my invention, as herein disclosed, may be made within the scope of what is claimed without departing from the spirit of my invention.

Having described my invention, what I claim as new and desire to protect by Letters Patent is:

1. A control device for beer dispensing systems comprising a hollow body having a bore therein, said body at one end of the bore being provided with an inlet and at the other end of the bore being provided with an outlet, the bore at the inlet end being uniformly tapered, a core disposed within said bore and having a tapered portion of substantially the same taper as said bore and of a length not less than one-half the diameter of the core and closely fitting the tapered portion of the core to form an annular restriction extending throughout a portion of the length of the core to reduce the pressure of the beer, said core at the discharge end of the bore being gradually increasingly spaced from the walls of the bore in the direction of flow for a distance at least equal to the length of said first named tapered portion to provide a passageway of gradually increasing cross sectional area to control the expansion of the gas within the beer and prevent agitation thereof in leaving the annular passageway formed by the core, and means for moving said core axially within said bore to vary the reduction in pressure afforded by said restriction.

2. A control device for beer dispensing systems comprising a hollow body having a bore therein, said body at one end of the bore being provided with an inlet and at the other end of the bore being provided with an outlet, the bore at the inlet end being tapered, a core disposed within said bore and having a tapered portion of substantially the same taper as said bore and closely fitting the tapered portion of the core to form an annular restriction extending throughout a length of the core sufficient to reduce the pressure of the beer at the inlet to dispensing pressure at the outlet said core being disposed with the larger end at the inlet, said core at the discharge end of the bore being provided with a greater degree of taper tapering in the same direction as the taper at the inlet to form with the bore at such locality an annular passageway of gradually increasing cross sectional area to control the expansion of the gas within the beer and prevent agitation thereof in leaving the annular passageway formed by the core, and means for moving said core axially within said bore to vary the reduction in pressure afforded by said restriction.

RICHARD T. CORNELIUS